(12) United States Patent
Adam et al.

(10) Patent No.: US 9,460,348 B1
(45) Date of Patent: Oct. 4, 2016

(54) ASSOCIATING LOCATION HISTORY WITH PHOTOS

(71) Applicant: Google Inc., Mountain View, CA (US)

(72) Inventors: Hartwig Adam, Los Angeles, CA (US); Jignashu Parikh, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/721,573

(22) Filed: May 26, 2015

Related U.S. Application Data

(60) Provisional application No. 62/020,935, filed on Jul. 3, 2014.

(51) Int. Cl.
*G06K 9/68* (2006.01)
*G06K 9/00* (2006.01)

(52) U.S. Cl.
CPC ......... *G06K 9/00671* (2013.01); *G06K 9/0063* (2013.01)

(58) Field of Classification Search
CPC .. G06Q 20/10; G06Q 20/18; G06Q 30/0215; H04W 4/14

USPC ........................................................ 382/218
See application file for complete search history.

(56) References Cited

U.S. PATENT DOCUMENTS

| | | | |
|---|---|---|---|
| 6,741,864 B2 | 5/2004 | Wilcock et al. | |
| 8,417,000 B1 | 4/2013 | Mendis | |
| 8,718,373 B2 | 5/2014 | Mendis | |
| 2013/0315042 A1* | 11/2013 | Kindel | G04G 9/0076 368/10 |

* cited by examiner

*Primary Examiner* — Manuchehr Rahmjoo
(74) *Attorney, Agent, or Firm* — Middleton Reutlinger

(57) ABSTRACT

Methods and apparatus are disclosed for identifying a photo that lacks location metadata indicating where the photo was captured and determining a photo location to associate with the photo. In some implementations, a photo associated with a user is identified that includes metadata indicating a date and/or time it was captured, but lacks location data indicating where the photo was captured. In some versions of those implementations, a relationship of the metadata of the photo to at least one of a location date and a location time associated with a visit location of the user is determined. A photo location may be determined based on the visit location and associated with the photo. In some implementations, the visit location of the user may be determined independent of any location sensor.

22 Claims, 4 Drawing Sheets

| | Visit Locations | Location Dates | Location Times | Confidence Measure |
|---|---|---|---|---|
| 155A | Las Vegas | 1/1/14-1/3/15 | | 0.9 |
| 155B | Restaurant A | 1/2/14 | 7:45 | 0.8 |
| 155C | Venue A | 1/2/14 | 5:00-7:00 | 0.6 |

FIG. 3

Identify a photo associated with a user and lacking location data — 400

Identify a visit location of the user — 405

Determine a relationship of the photo to the visit location — 410

Determine a photo location based on the visit location — 415

Associate the photo location with the photo — 420

FIG. 4

ASSOCIATING LOCATION HISTORY WITH PHOTOS

BACKGROUND

Many digital photos are captured by a device (e.g., a smart phone having a camera or a stand-alone digital camera) that is equipped with a global positioning system (GPS) sensor that determines the location of the device based on GPS satellite data. Such devices may be configured to automatically determine GPS coordinates when a photo is captured with the camera and to embed location data related to the determined GPS coordinates in the metadata of the photo. However, not all devices that capture photos are equipped with a GPS sensor and/or an included GPS sensor may be intentionally disabled, unintentionally disabled, and/or unable to determine GPS coordinates (e.g., based on a weak or no signal with GPS satellites). In such cases, a photo captured by the device will not be associated with location data.

SUMMARY

This specification is directed generally to methods and apparatus for identifying a digital photo that lacks location data indicating where the photo was captured and determining a photo location to associate with the photo. For example, a photo of a user may contain metadata that indicates a date and/or time that the photo was captured, but that fails to indicate a location at which the photo was captured. For instance, a user may utilize a device to capture a photo but the device may not have a GPS sensor and/or other location sensor—or such sensors may be disabled. This specification discloses various implementations for determining a relationship of such a photo to one or more visit locations of the user, and determining a photo location to associate with the photo based on one or more of the visit locations.

In some implementations, a digital photo associated with a user is identified that includes metadata indicating a date and/or time it was captured, but lacks location data indicating where the photo was captured. In some versions of those implementations, a relationship of the metadata of the photo to at least one of a location date and a location time associated with a visit location of the user is determined. A photo location may then be determined based on the visit location and assigned to the photo.

In some implementations, the visit location of the user may be determined independent of any location sensor. In other words, the visit location may be a location determined to be potentially visited by the user and determined independent of any location sensor of a computing device of the user such as a GPS sensor, a Wi-Fi Sensor, etc. In some of those implementations, the visit location may be determined based on one or more of the user such as e-mails sent/received; text messages sent/received; social networking posts, tweets, messages; submitted search queries (e.g., directional search queries); created calendar entries; financial transaction history; and/or browsing history. For example, a visit location of a user and a location date and/or location time associated with the visit location may be based on reservation information extracted from an email of the user. For instance, an email confirming a hotel reservation may be utilized to determine one or more visit locations such as the hotel, a neighborhood of the hotel, a city of the hotel, etc. and to determine one or more dates and/or times associated with the visit locations such as a time from a check-in date to a check-out date. As another example, a visit location of a user and a location date and/or location time associated with the visit location may be based a calendar entry that includes an indication of the visit location and is for a particular date and for a particular time range.

In some implementations, a computer implemented method may be provided that includes the steps of: identifying a digital photo associated with a user, the photo including metadata indicating a photo date and photo time when the photo was captured, the metadata lacking location data indicating where the photo was captured; identifying a visit location of the user, the visit location being determined independent of any location sensor and being associated with at least one of: a location date and a location time, wherein the location date and the location time are indicative of when the user potentially interacted with the visit location; determining a relationship of the metadata of the photo to at least one of the location date and the location time of the visit location; determining, responsive to determining the relationship, a photo location based on the visit location; and assigning the photo location to the photo.

These methods and other implementations of technology disclosed herein may each optionally include one or more of the following features.

In some implementations, the visit location is determined based on one or more non-location sensor based electronic information items of the user. In some versions of those implementations, the electronic information items include at least one of: an email, a text message, a calendar entry, a task entry, and a webpage.

In some implementations, the method further includes identifying a confidence measure for the visit location, and determining the photo location includes determining the photo location based on the confidence measure of the visit location. In some versions of those implementations, the confidence measure is indicative of likelihood the user was present at the visit location on the location date at the location time. In some versions of those implementations, the method further includes determining the confidence measure based on: a type of electronic information item from which the visit location of the user was determined; a quantity of the electronic information items that indicate a visit to the visit location; and/or a time difference between the photo time and the location time. In some versions of those implementations, the visit location indicates a first area and determining the photo location based on the confidence measure of the location includes: determining the confidence measure fails to satisfy a threshold; and determining, based on the confidence measure failing to satisfy the threshold, a second area for the photo location that encompasses the first area and one or more additional areas. For example, the first area may indicate a business location and the second area may indicate a geographic region in which the business location is included.

In some implementations, the method further includes: identifying an additional visit location of the user, the additional visit location being determined independent of any location sensor and being associated with at least one of: an additional location date and an additional location time; wherein the additional visit location is indicative of a first area that is distinct from a second area indicated by the visit location; and determining a relationship of the metadata of the photo to at least one of the additional location date and the additional location time of the additional location. In some versions of those implementations, determining the photo location based on the visit location includes determining the photo location based on both the visit location and the additional visit location. In some versions of those implementations, the method further includes determining the first area is indicative of a more granular area than the second area, and determining the photo location based on the location includes determining the photo location exclusive of the additional location based on determining the first area is indicative of a more granular area than the second area.

In some implementations, determining the relationship of the metadata of the photo to at least one of the location date and the location time of the visit location includes: matching the photo date to the location date and matching the photo time to the location time. In some versions of those implementations, the location time defines a time range and matching the photo time to the location time includes determining the photo time is within the time range or is within a threshold of the time range.

In some implementations, the method further includes identifying at least one location indication based on the photo, and determining the relationship of the data of the photo to at least one of the location date and the location time of the visit location includes verifying the relationship based on the location indication. In some versions of those implementations, the location indication is based on image processing of the photo. For example, an image processing system may determine one or more entities in the photo based on image processing techniques and one or more relationships of the entities in the photo to the visit location may be identified to verify the visit location is related to the photo.

In some implementations, the method further includes: identifying location-sensor based location data of the user that indicates a plurality of potential visit locations; and determining a relationship of the location data to the metadata of the photo; wherein determining the relationship of the data of the photo to at least one of the location date and the location time of the visit location further includes determining the relationship based on a relationship between the visit location and the location data.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates an example of a portion of a visit locations database that may be utilized to determine a photo location to associate with a photo.

FIG. 4 is a flow chart illustrating an example method of determining a photo location to associate with a photo.

DETAILED DESCRIPTION

Figure 1:
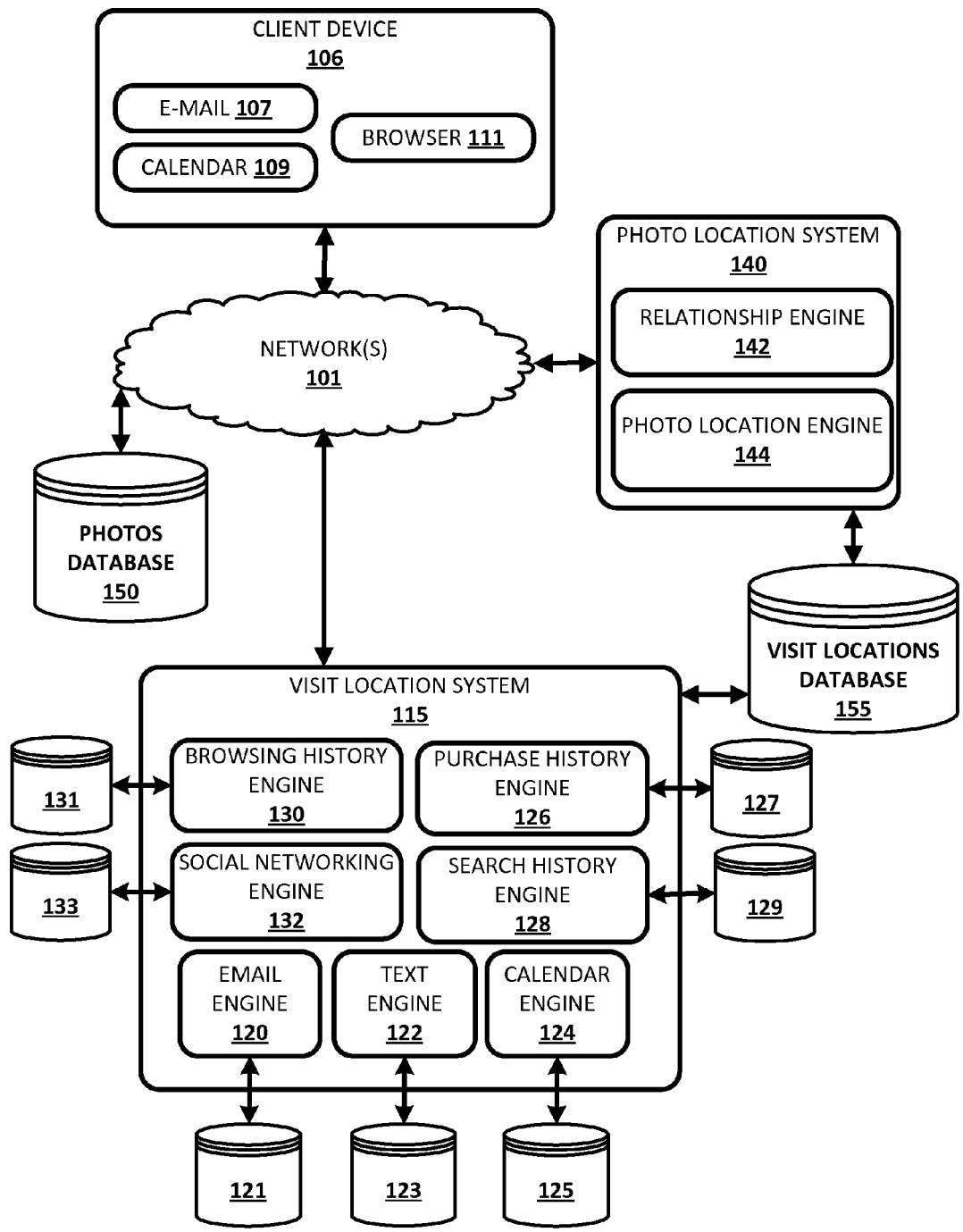
FIG. 1 illustrates an example environment in which a photo location to associate with a photo may be determined.

FIG. 1 illustrates an example environment in which a photo location to associate with a photo may be determined. The example environment includes a client device 106, a visit location system 115, and a photo location system 140. Photo location system 140 is an example of an apparatus in which the systems, components, and techniques described herein may be implemented and/or with which systems, components, and techniques described herein may interface.

Client device 106 may be a computer coupled to the visit location system 115, the photo location system 140, and/or another component (e.g., a photo management system in communication with the photo location system 140 and/or photos database 150) through one or more networks 101 such as a local area network (LAN) or wide area network (WAN) such as the Internet. The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. While the user likely will operate a plurality of computing devices, for the sake of brevity, examples described in this disclosure will focus on the user operating client device 106.

As described herein, the visit location system 115 may determine visit locations of a user based on electronic information items associated with the user. In some implementations, one or more of the electronic information items may be consumed and/or manipulated by the user via client device 106 and/or indicative of activities of the user via client device 106. Client device 106 may operate one or more applications and/or components such as those that facilitate user consumption and manipulation of certain electronic information items, those that provide all or aspects of certain electronic information items to visit location system 115, and/or those that facilitate provision of information related to a photo location of a photo determined by photo location system 140. These application and/or components may include, but are not limited, to an email component 107, a calendar component 109 (which in some implementations may be a client, in others may be standalone, and in some cases may be integrated with email component 107), a browser 111, and so forth. In some implementations, browser 111 may be selectively used as a de facto email and/or calendar client. In some instances, one or more of these applications and/or components may be operated on multiple client devices operated by the user.

As used herein, electronic information items of a user may include, for example, one or more of: communications sent or received by the user, such as emails, text messages, voicemails (e.g., transcribed using speech recognition), social networking communications (e.g., posts, tweets, private messages, status updates, check-ins, instant messages); searches of the user submitted to one or more search engines; calendar entries of the user; task entries of the user;

extracted reservation information (e.g., extracted from an e-mail or calendar entry of the user); spreadsheets of the user (e.g., that the user uses to organize a schedule); browsing history of the user (e.g., indicating one or more documents accessed by the user such as webpages, videos, and/or images); information provided by one or more applications of a computing device of the user based on user actions via those applications; and so forth.

Client device 106, visit location system 115, and photo location system 140 each include one or more memories for storage of data and software applications, one or more processors for accessing data and executing applications, and other components that facilitate communication over a network. The operations performed by client device 106, visit location system 115, and photo location system 140 may be distributed across multiple computer systems. Photo location system 140 may be implemented as, for example, computer programs running on one or more computers in one or more locations that are coupled to each other through a network.

Generally, visit location system 115 analyzes electronic information items of users to determine physical visit locations that the electronic information items indicate the user has visited, is visiting, and/or will visit. In some implementations, the visit location system 115 may additionally analyze the electronic information items to determine location dates and/or location times associated with the determined visit locations. In some implementations, the visit location system 115 may additionally determine a confidence measure for each of one or more of the determined visit locations based on the electronic information items. In some implementations, the visit location system 115 may store determined physical visit locations, location dates, location times, and/or confidence measures in a visit locations database 155.

In various implementations, visit location system 115 may include and/or be in communication with an email engine 120, a text messaging engine 122, a calendar engine 124, a purchase history engine 126, a search history engine 128, a browsing history engine 130, a social networking engine 132, and/or other engine that maintains and/or processes electronic information items of one or more users. Generally, each of the engines 120, 122, 124, 126, 128, 130, and/or 132 may determine and/or maintain certain electronic information items of users that may be utilized to determine visit locations as described herein. In some implementations, one or more of engines 120, 122, 124, 126, 128, 130, and/or 132 may be omitted. For example, in some implementations visit location system 115 may have access to one or more indices that each includes electronic information items such as those described herein, and one or more of the engines 120, 122, 124, 126, 128, 130, and/or 132 may be omitted. In some implementations, all or aspects of one or more of engines 120, 122, 124, 126, 128, 130, and/or 132 may be combined. In some implementations, one or more of engines 120, 122, 124, 126, 128, 130, and/or 132 may be implemented in a component that is separate from visit location system 115. For example, in some implementations, one or more of engines 120, 122, 124, 126, 128, 130, and/or 132, or any operative portion thereof, may be implemented in a component that is executed by client device 106.

Email engine 120 may maintain an index 121 of email correspondence between various users that may be available, in whole or in selective part, to various components of visit location system 115. For instance, email engine 120 may include an email server, such as a simple mail transfer protocol ("SMTP") server that operates to permit users to exchange email messages. In various implementations, email engine 120 may maintain, e.g., in index 121, one or more user mailboxes in which email correspondence is stored. In some implementations, the email component 107 and/or browser 111 of client device 106 may be in communication with email engine 120 and/or index 121 and may be utilized to access email correspondence via index 121. Similar to email engine 120, text messaging engine 122 may maintain another index 123 that includes or facilitates access to one or more text messages exchanged between two or more users. While depicted as part of visit location system 115 in FIG. 1, in various implementations, all or part of email engine 120, index 121 (e.g., one or more user mailboxes), text messaging engine 122 and/or index 123 may be omitted and/or implemented elsewhere, e.g., on an email service system, text messaging service system, and/or client device 106.

Calendar engine 124 may be configured to maintain an index 125 of calendar entries and/or other scheduling-related information (e.g., reminders, task entries) pertaining to one or more users. In some implementations, scheduling-related information of a user stored locally on the client device 106 by calendar component 109 and index 125 may include one or more of the same electronic information items and/or may contain one or more different electronic information items. For example, the calendar entries of client device 106 may be synched to the index 125 on a periodic or other basis. Purchase history engine 126 may maintain an index 127 of one or more purchase histories associated with one or more users. Index 127 may include evidence of purchase history in various forms, including but not limited to a list of purchases made with one or more credit cards or electronic wallets, a corpus of financial statements (e.g., bank statements, credit card statements), receipts, invoices, and so forth. Search history engine 128 may maintain an index 129 of one or more search histories associated with one or more users. For example, search history engine 128 may maintain location-based queries in index 129 such as queries that seek directions to a particular location. Browsing history engine 130 may maintain an index 130 of one or more browsing histories associated with one or more users. For example, a user's browsing activities via browser 111 of client device 106 may be maintained by browsing history engine 130 in index 131. In some implementations, a user's browsing activities via browser 111 of client device 106 may additionally and/or alternatively be maintained locally on the client device 106. Social networking engine 132 may maintain an index 133 of one or more social networking posts, messages, tweets, check-ins, and/or other social networking information associated with one or more users. While depicted as part of visit location system 115 in FIG. 1, in various implementations, all or part of calendar engine 124, purchase history engine 126, search history engine 128, browsing history engine 130, and/or social networking engine 132, and/or their respective indices 125, 127, 129, 131, and/or 133 may be omitted and/or implemented elsewhere, e.g., on client device 106 and/or other computing devices.

In this specification, the term "database" and "index" will be used broadly to refer to any collection of data. The data of the database and/or the index does not need to be structured in any particular way and it can be stored on storage devices in one or more geographic locations. Thus, for example, the indices 121, 123, 125, 127, 129, 131, and/or 133 may include multiple collections of data, each of which may be organized and accessed differently.

In various implementations, visit location system 115 may be configured to obtain one or more electronic information items, e.g., from one or more of email component 107, email engine 120, calendar component 109, text messaging engine 122, calendar engine 124, purchase history engine 126, social network engine 132, or elsewhere, and may analyze the one or more electronic information items to determine visit locations and associated location dates, location times, and/or confidence measures associated with the visit locations. Visit location system 115 may utilize various techniques to determine such information. These techniques include, but are not limited to, heuristics, regular expressions, machine learning, rules-based approaches, and so forth. In some implementations, visit location system 115 may include (or be implemented as) a machine learning system, e.g., configured to receive input data based on one or more electronic information items and provide output data indicative of a visited location and associated location dates and/or location times indicated in the electronic information items.

As one example of determining a visit location and associated location dates and location times, for an information item that is an email (e.g., from index 121) from an airline with an itinerary, visit location system 115 may automatically extract a visit location (e.g., a flight destination) and location date(s) associated with the visit location (e.g., the "arrival" date through the "departure" date). For example, the format of such an email may be known, and items from the email may be extracted based on one or more rules configured based on the format of the email. As another example, for an email from index 121 that is a hotel reservation, visit location system 115 may extract one or more visit locations such as the hotel, a neighborhood of the hotel, a city of the hotel, etc. and location dates and/or location times associated with the visit locations such as a location date range from a check-in date to a check-out date.

As yet another example, for a calendar entry from index 125, visit location system 115 may utilize information in the "location" field to determine a visit location and utilize information in the "start time/date" and "end time/date" fields to determine a location date and a location time range associated with the visit location. In some implementations, the "location" field may contain a street address, a ZIP code, and/or other information that may be utilized as the visit location. In some implementations, the "location" field may contain a reference to an alias or other property of a business or other entity and visit location system 115 may utilize an entity database or other database (e.g., a contacts collection of the user) to determine a visit location associated with such an entity. For example, an entity database may be utilized that includes a collection of entities and includes, for each of one or more of the entities, a mapping to one or more properties associated with the entity and/or one or more entities related to the entity. For example, the entity database 154 may be a knowledge graph, such as a local knowledge graph that includes entities associated with businesses and includes properties for each of the entities such as phone numbers, addresses, open hours, etc. An alias or other property of an entity in an information item, and optionally other contextual information (e.g., information of the user who is associated with the information item, other content of the information item), may be utilized to identify a particular entity and determine an address or other location indication of the entity to use as the visit location.

As yet another example, for a purchase indicated in index 127, visit location system 115 may utilize information in a "vendor" field to determine a visit location and utilize information in "purchase date" and "purchase time" fields to determine a location date and location time associated with the visit location. As yet another example, for a webpage indicated as visited by index 131, visit location system 115 may utilize information of the webpage and/or associated with the webpage to determine a visit location and associated location date and/or location time. For example, the webpage may be for an upcoming marathon race and visit location system 115 may determine a visit location that is a city of the race indicated on the webpage and an associated location date that is a date of the race indicated on the webpage (e.g., based on presence of certain cues on the webpage such as "when:", "where:", etc.). As yet another example, for a locational search query indicated in index 129 that is for directions to a destination, visit location system 115 may utilize the destination as the visit location, utilize the submission date of the query as an associated location date and optionally determine an associated location time based on a time of submission of the query. For example, a time range following the time of submission may be used as the location time and/or a time range that takes into account travel time to the destination may be used as the location time.

As yet another example, suppose a user receives a text message from a friend with the text, "Birthday Dinner at Restaurant A tomorrow at 7:00 PM". Visit location system 115 may determine a location of "Restaurant A" based on, for example, matching "Restaurant A" to a restaurant near the user in an entity database and/or other database, and identifying a location property for the restaurant in the database. Visit location system 115 may further resolve "tomorrow" as the day following the day the text message was sent and utilize that date as a location date associated with the visit location. Visit location system 115 may further determine "7:00 PM" references a time based on one or more rules and utilize that time as a location time associated with the visit location.

As described herein, in some implementations the visit location system 115 and/or the photo location system 140 may determine a confidence measure for each of one or more of the visit locations. In some implementations, a determined confidence measure of a visit location may be indicative of a likelihood the user was present at the visit location on the location date associated with the visit location and/or at the location time associated with the visit location. In some versions of those implementations, the visit location system 115 may determine the confidence measure based on the information item(s) from which the visit location was determined. For example, some information item types such as calendar entries may be deemed more trustworthy than other information item types such as browsing history (e.g., a calendar entry for an event at a location may be more indicative of the user attending the event than a user's viewing of a webpage related to the event). Thus, in such an example the confidence measure for a visit location determined based on a calendar entry may be more indicative of confidence than a confidence measure for a visit location determined based on browsing history. Also, for example, when a visit location is determined based on multiple electronic information items and/or a visit location is corroborated by multiple electronic information items, the confidence measure may be based on a quantity of the electronic information items that indicate a visit to the visit location. For example, a calendar entry indicating a visit to a visit location, standing alone, may be less trustworthy than a calendar entry, email, and search that are all indicative of a visit to the visit location. In some implementations, a determined confidence measure associated with a visit location may be represented as a probability, e.g., along a range and/or as a percentage. In some implementations, the confidence measure may be binary, e.g., the visit location was likely visited or likely not visited.

As also described herein, in some implementations the visit location system 115 may store determined physical visit locations, location dates, location times, and/or confidence measures in a visit locations database 155. For example, with reference to FIG. 3, an example of a portion of visit locations database 155 is illustrated. The illustrated portion includes entries 155A, 155B, and 155C. Each entry 155A, 155B, 155C includes a visit location, a location date, a location time, and/or confidence measure. Ellipses are provided in FIG. 3 to indicate additional entries may be included in the visit locations database 155 and/or that the entries may include additional and/or alternative data than that illustrated in FIG. 3. In some implementations, visit locations database 155 may include entries of a plurality of users and access to entries of a user in database may be allowed for only the user and/or one or more other users or components authorized by the user such as visit location system 115 and photo location system 140.

Generally, photo location system 140 determines photo locations to associate with photos that fail to indicate a location at which the photo was captured. For example, photo location system 140 may receive photos and/or data associated with photos from client device 106 and/or photos database 150. One or more of the photos may fail to include data that indicates locations at which the photos were taken and the photo location system 140 may determine photo locations to associate with those photos based on visit locations indicated in visit locations database 155. In some implementations, photos database 150 stores photos of one or more users. For example, users may upload individual photos or photo albums to the photos database 150 via desktop computers, smart phones, online services, etc. The photos in photos database 150 may include photos captured using a digital camera and may conform to any suitable format. The photos in photos database 150 may include those with metadata that defines one or more properties of the photo such as a photo location and/or photo date. In some implementations, photos database 150 may include photos of a plurality of users and access to photos of a user in photos database 150 may be allowed for only the user and/or one or more other users or components authorized by the user such as photo location system 140 and/or other users authorized by the user to view the photos.

In various implementations, photo location system 140 may include a relationship engine 142 and a photo location engine 144. In some implementations, one or more of engines 142 and/or 144 may be omitted or combined. In some implementations, one or more of engines 142 and/or 144 may be implemented in a component that is separate from photo location system 140. For example, in some implementations, one or more of engines 142 and/or 144 or any operative portion thereof, may be implemented in a component that is executed by client device 106.

Generally, for a given photo of a user that lacks location data, relationship engine 142 determines a relationship of data of the photo to at least one of a location date and a location time associated with a visit location of the user. For example, relationship engine 142 may identify an identifier of a user with the photo and utilize the identifier to identify one or more visit locations that are also associated with the identifier. For instance, the photo may be associated with user identification data in photos database 150 and/or user identification data may be provided by client device 106 when the photo is provided to the photo location system 140 directly from client device 106. Relationship engine 142 may further identify a photo date and/or a photo time from metadata of the photo. The photo date indicates a date when the photo was captured and the photo time indicates a time when the photo was captured.

In some implementations, the relationship engine 142 may determine a visit location that has a relationship to a photo of a user based on utilizing the photo date and/or photo time of the photo to determine one or more visit locations of the user in visit locations database 155 that are associated with a location date and/or location time that match the photo date and/or photo time. Soft matching and/or exact matching may be utilized. In some implementations, the relationship engine 142 may require matching of the photo date to the location date and also require matching of the photo time to the location time. As one example, the photo date may be "1/1/14" and the photo time may be "1:45 PM". The relationship engine 142 may determine a visit location that has a relationship to the photo based on the visit location having a matching location date of "1/1/14" and a matching location time of "1:00 PM-3:00 PM". On the other hand, the relationship engine 142 may determine a second visit location does not have a relationship to the photo based on the visit location having a matching location date of "1/1/14", but having a location time of "7:00 AM" that does not match the photo time. As yet another example, the photo date may be "1/1/14" and the photo time may be "1:45 PM" and the relationship engine 142 may determine a visit location that has a relationship to the photo based on the visit location having a matching location date of "1/1/14" and a matching location time of "1:30 PM". In the immediately preceding example, soft matching is utilized. The soft matching may define, for example, a time difference (e.g., 15 minutes, 30 minute, 2 hours) between a location time and a photo time that may still constitute a match.

In some implementations, the time difference utilized for soft matching may take into account that the photo date and/or photo time of a digital photo may fail to account for a time zone change (e.g., the time of the photo capturing device was not updated to reflect a time zone change on a trip). For example, for a photo date and time of a given photo, the relationship engine 142 may identify visit locations associated with times that are within a threshold of that time and that are in different time zones than a "typical" time zone of the user. If such a visit location is identified, the relationship engine 142 may adjust the soft matching based on a time difference between the visit location and the "typical" time zone of the user. For instance, for a photo date of "1/1/14" and a photo time of "1:45 PM", the relationship engine 142 may identify a visit location with a visit date of "1/1/14" and a visit time of "10:40" AM. The relationship engine 142 may further determine a negative three hour time difference between the visit location and a typical time zone of the user. Based on the determination, the relationship engine 142 may determine a match when the visit location has a visit time that is two and a half to three and a half hours earlier than the photo time. In some of those implementations, the relationship engine 142 may adjust the confidence measure of the match based on the soft matching and/or require further verification before determining a match (e.g., verification based on a location indication as described herein).

In some implementations, the relationship engine 142 may require matching of only the photo date to the location date. For example, the photo date may be "1/1/14" and the photo time may be "1:45 PM" and the relationship engine 142 may determine a visit location that has a relationship to the photo based on the visit location having a matching location date of "1/1/14", and irrespective of whether the photo includes a matching photo time. Which matching techniques are employed by the relationship engine 142 may vary from implementation to implementation and may be tailored based on one or more considerations such as desired coverage and/or accuracy.

In some implementations, the relationship engine 142 may determine a confidence measure for a visit location based on a degree of matching between the data of the photo and the location date and/or location time associated with the visit location. In some of those implementations, a confidence measure may be defined for the visit location in the visit locations database 155 (e.g., by the visit location system 115 as described above) and determining the confidence measure by the relationship engine 142 may include adjusting the confidence measure defined in the visit locations database 155. In some other implementations, determining the confidence measure by the relationship engine 142 may include calculating a new confidence measure independent of a confidence measure defined in the visit locations database 155, if any. As one example of determining a confidence measure for a visit location based on a degree of matching, a visit location may be associated with a date of Aug. 1, 2015 and a time range of 2:00-4:00. The relationship engine 142 may determine a confidence measure for the visit location that is more indicative of confidence for a first photo having a photo date of Aug. 1, 2015 and photo time of 3:00 than for a second photo having a photo date of Aug. 1, 2015 and photo time of 1:45.

In some implementations, the relationship engine 142 may determine multiple visit locations of the user that have a relationship to a photo of the user. For example, the visit location system 115 may determine a first visit location of "Las Vegas" and associated dates of April $30^{th}$ to May $2^{nd}$ based on an email that includes a flight confirmation for a flight of the user to Las Vegas. The visit location system 115 may also determine a second visit location associated with "Restaurant 1" in Las Vegas that is associated with a date of May $1^{st}$ and a time of "7:45 PM" based on reservation information provided via an application of a computing device of the user (e.g., an application devoted to making restaurant reservations). The relationship engine 142 may determine that a photo taken by the user on May $1^{st}$ at 8:00 PM has a relationship to both the "Las Vegas" visit location and the "Restaurant 1" visit location based on techniques described herein.

In some implementations, the relationship engine 142 may determine a visit location of a user has a relationship to a photo of the user based at least in part on a relationship of the visit location to ambiguous location-sensor based location data determined to be related to the photo. For example, the location-sensor based location data may be based on a Wi-Fi sensor and may indicate a plurality of potential visit locations (e.g., the location data may indicate a geographic area that encompasses multiple potential visit locations). The relationship engine 142 may optionally first determine a relationship between the location-sensor based location data and the data of the photo, then determine the visit location of the user based on a relationship between the visit location and the location-sensor based location data. For instance, the relationship engine 142 may determine a relationship between the location-sensor based location data and the photo based on matching a time and/or date thereof to the photo date and/or photo time. The relationship engine 142 may then determine a relationship of the visit location to the photo based at least in part on determining the visit location is related to the location-sensor based location data (e.g., is one of the potential visit locations indicated by the location-sensor based location data or is within a threshold distance of one of the potential visit locations; and/or is associated with the same date and/or same or similar time as the location-sensor based location data).

In some implementations, the relationship engine 142 may verify a determined relationship of a photo to a visit location based on at least one location indication based on the photo itself. For example, image processing may be performed on the photo by an image processing system (not illustrated) to determine one or more entities in the photo and an indication of the entities may be provided to the relationship engine 142. The relationship engine 142 may identify one or more relationships of the one or more entities to the visit location to verify the visit location is related to the photo. For example, the visit location may be "Las Vegas" and an entity determined via image analysis may be a slot machine. The relationship engine 142 may utilize an entity database and/or other database to determine a relationship between a slot machine and Las Vegas and may verify the visit location based on the presence of the relationship. Also, for example, metadata of the photo may include one or more tags applied to the photo by the user or other user(s) and the relationship engine may identify a relationship of the one or more tags to the visit location to verify the visit location is related to the photo. For example, the visit location may be "Las Vegas" and the tag may include "gambling". The relationship engine 142 may utilize an entity database and/or other database to determine a relationship between gambling and Las Vegas and may verify the visit location based on the presence of the relationship. In some implementations, the relationship engine 142 may additionally and/or alternatively determine a confidence measure of a visit location for a photo based on at least one location indication based on the photo itself. For example, determining a visit location has a relationship to a location indication of a photo may result in a confidence measure for the visit location for the photo that is more indicative of confidence than if no relationship to the location indication was determined.

Generally, for a given photo of a user that lacks location data, photo location engine 144 determines a photo location based on the one or more visit locations related to the photo as determined by relationship engine 142. In some implementations, a single visit location may be determined by the relationship engine 142 and the photo location engine 144 may determine a photo location that is the same as the visit location. In some implementations, a single visit location may be determined by the relationship engine 142 and the photo location engine 144 may determine a photo location that encompasses the visit location and one or more additional areas. For example, the visit location may identify a particular business or address and the photo location engine 144 may determine an area that encompasses the particular business or address and additional areas such as a neighborhood, city, or other region that encompasses the particular business or address.

In some implementations, the photo location engine 144 may determine whether to determine a photo location based on a visit location based on a confidence measure for the visit location. For example, in some implementations the photo location engine 144 may determine a photo location based on the visit location only when the confidence measure satisfies a threshold. In some implementations, the photo location engine 144 may determine a photo location based on the confidence measure for a visit location. For example, the visit location may indicate a first area such as a particular address in a city. If the confidence measure for the visit location satisfies a threshold, the photo location engine 144 may determine a photo location that includes the particular address (and optionally one or more additional locations such as larger areas that encompass the particular address). If, on the other hand, the confidence measure for the visit location fails to satisfy a threshold, the photo location engine 144 may determine a photo location that does not include the particular address and instead includes one or more larger areas such as a neighborhood, city, or region that encompasses the particular address. In some implementations, a photo location may include multiple locations and each may optionally be associated with a confidence measure. For example, referring to the previous example, the particular address, the neighborhood, and the city may all be determined as photo locations and associated with confidence measures (e.g., least amount of confidence in the particular address, greatest amount of confidence in the city).

A described above, in some implementations, multiple visit locations may be determined by the relationship engine 142. For example, a first visit location of "Las Vegas" and associated dates of April $30^{th}$ to May $2^{nd}$ may be determined based on an email that includes a flight confirmation for a flight of the user to Las Vegas. A second visit location associated with "Restaurant 1" in Las Vegas that is associated with a date of May $1^{st}$ and a time of "7:45 PM" may also be determined based on reservation information provided via an application of a computing device of the user. In some implementations, the photo location engine 144 may determine a photo location based on the multiple visit locations. For example, the photo location may include a location associated with "Restaurant 1" and a location associated with "Las Vegas". In some implementations, the photo location engine 144 may determine the photo location based on the visit location that is indicative of the more granular area. For example, the photo location may be determined based only on the location associated with "Restaurant 1" since that location defines a more granular area than "Las Vegas". In some implementations, the photo location engine 144 may determine the photo location based on the visit location that is associated with a confidence measure (as determined by visit location system 115 and/or relationship engine 142) that is most indicative of confidence. For example, the location associated with "Restaurant 1" may be utilized based on a closer match between the photo date/time and the location associated with "Restaurant 1" (e.g., based on the location associated with "Restaurant 1" having a more granular "date" and/or having both a defined date and a defined time period). Combinations of the aforementioned techniques may also be utilized to determine a photo location based on multiple visit locations of the user with a relationship to the photo.

In some implementations, photo location engine 144 may include (or be implemented as) a machine learning system, e.g., configured to receive input data based on one or more visit locations (e.g., features related to the visit locations, confidence measures for the visit locations, time differences between the visit times and the photo times) and provide output data indicative of a photo location. In some versions of those implementations, the machine learning system may be trained based on supervised training data. For example, positive and/or negative training examples of supervised training data may be determined based on user feedback related to determined photo locations, such as the user feedback described below with respect to FIG. 2.

Figure 2:
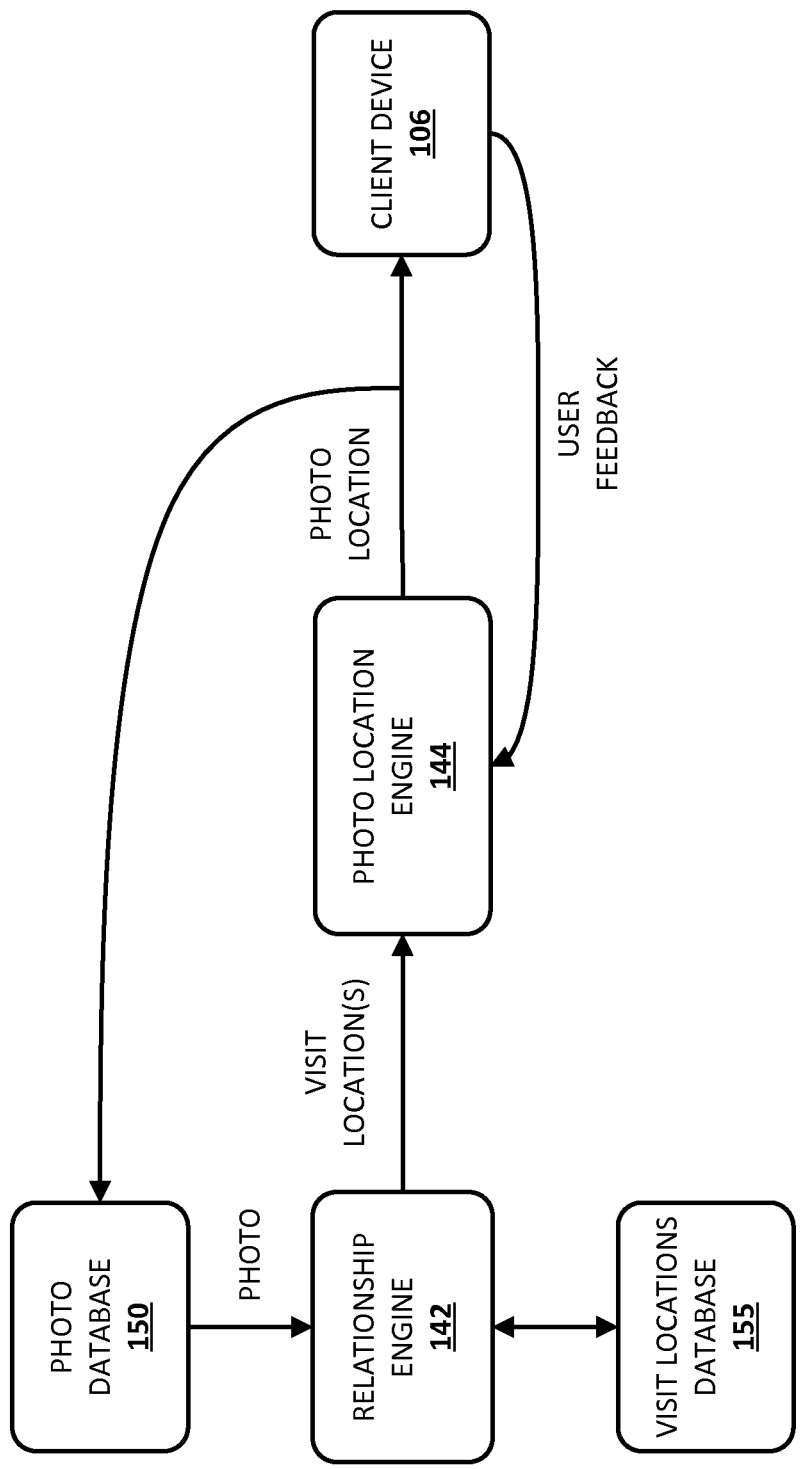
FIG. 2 illustrates one example of how a photo may be associated with a photo location.

FIG. 2 schematically depicts one example of how a photo may be associated with a photo location. Relationship engine 142 identifies a photo from photo database 150 that lacks location data indicating where the photo was captured. For example, the relationship engine 142 may identify a photo of a user that includes a photo date of Jan. 2, 2014 and a photo time of 7:15. Relationship engine 142 uses a photo date and/or photo time to determine one or more visit locations of the user in visit locations database 155 that are associated with a location date and/or location time that match the photo date and/or photo time. For example, continuing with the immediately preceding example, relationship engine 142 may determine visit locations of "Las Vegas", "Restaurant A", and "Venue A" are each associated with a location date and/or location time that match the photo date and/or photo time. For example, with reference to FIG. 3, relationship engine 142 may identify the visit locations of entries 155A, 155B, and 155C based on determining the dates and/or times of those entries match the photo date of Jan. 2, 2014 and the photo time of 7:15.

In some implementations, the relationship engine 142 may determine a confidence measure for each of one or more determined visit locations based on a degree of matching between the data of the photo and the location date and/or location time associated with the visit location. For example, with reference to FIG. 3 and continuing with the example of the previous paragraph, the relationship engine 142 may determine a confidence measure for each of the visit locations of entries 155A, 155B, and 155C based on adjusting the confidence measures defined for those visit locations in the entries 155A, 155B, and 155C (e.g., as determined by the visit location system 115 as described above). In the example of FIG. 3, a higher confidence level indicates more confidence than a lower confidence level. For example, the relationship engine 142 may determine a confidence measure for "Las Vegas" that demotes the confidence measure of "0.9" of FIG. 3 based on, for example, the entry 155A failing to have a matching location time, and/or based on the matching location date of entry 155A being of a low granularity (e.g., it defines a date range instead of a single date). Also, for example, the relationship engine 142 may determine a confidence measure for "Restaurant A" that demotes the confidence measure of "0.8" of FIG. 3 based on, for example, the entry 155B having a location time that is only a soft match to the photo time. In some implementations, the degree of demotion may be based on the time difference between the location time and the photo time. In some implementations, the degree of demotion of the confidence measure for "Restaurant A" may be less than the degree of demotion for "Las Vegas". Also, for example, the relationship engine 142 may determine a confidence measure for "Venue A" that demotes the confidence measure of "0.6" of FIG. 3 based on, for example, the entry 155C having a location time that is only a soft match to the photo time. In some implementations, the degree of demotion of the confidence measure for "Restaurant A" may be less than the degree of demotion for "Las Vegas" and less than the degree of demotion for "Restaurant A" (e.g., based on a time difference of only 15 minutes as compared to 30 minutes for "Restaurant A").

The relationship engine 142 provides the one or more determined visit locations and optional confidence measures to photo location engine 144. The photo location engine 144 determines a photo location based on the provided one or more visit locations and optional confidence measures. For example, and continuing with the example of the previous paragraph, in some implementations the photo location engine 144 may determine a photo location based only on the visit location with the highest confidence measure as determined by the relationship engine 142. For instance, the photo location engine 144 may determine a photo location that is the same as the visit location with the highest confidence measure. Also, for example, in some implementations, the photo location engine 144 may eliminate the "Las Vegas" visit location based on that visit location having the lowest adjusted confidence measure (as determined by relationship engine 142) and determine a photo location based on the "Restaurant A" and the "Venue A" visit locations. For instance, the photo location engine 144 may determine a photo location that includes both the "Restaurant A" and the "Venue A" locations and/or that includes an area that encompasses both the "Restaurant A" and the "Venue A" locations. Also, for example, in some implementations, the photo location engine 144 may eliminate the "Las Vegas" visit location based on that visit location defining a less granular area than the "Restaurant A" and the "Venue A" visit locations.

The photo location engine 144 provides the determined association of the photo to the photo location to the photo database 150 and/or the client device 106. In some implementations, the photo location engine 144 and/or other component may modify the metadata of the photo to include the photo location determined to be associated with the photo. For example, the photo location engine 144 may modify the metadata of the photo and provide the photo with the modified metadata to the photo database 150 and/or the client device 106.

Figure 5:
FIG. 5 illustrates an example of a user interface prompt that may be provided to a user to verify a photo location associated with a photo.

In some implementations, the photo location engine 144 may optionally determine a prompt to provide to client device 106 to verify one or more determined photo locations. The user may respond to the prompt via client device 106 to provide user feedback to the photo location engine 144 and the photo location engine 144 may refine or verify a determined photo location based on the user feedback. For example, with reference to FIG. 5, a user interface prompt that may be provided to a user to verify a photo location associated with a photo is illustrated. Content of the prompt may be determined by the photo location engine 144 and provided to client device 106 for generating and displaying of the prompt to the user. In FIG. 5, a photo location that includes both "Restaurant A" and "Venue A" has been determined for a photo and the user is prompted to verify whether the photo location should include only "Restaurant A", only "Venue A", or another location. The user may select one of the options and the user's selection may be provided as user feedback to the photo location engine 144. For example, the user may select "Restaurant A" and the photo location engine 144 may refine the photo location for the photo to include only "Restaurant A" based on the user's selection. The refined photo location may be provided to the photo database 150 and/or the client device 106.

FIG. 4 is a flow chart illustrating an example method of determining a photo location to associate with a photo. For convenience, the operations of the flow chart are described with reference to a system that performs the operations. This system may include various components of various computer systems. For instance, some operations may be performed at the client device 106, while other operations may be performed by one or more components of the photo location system 140, such as relationship engine 142 and/or photo location engine 144. Moreover, while operations of the method of FIG. 4 are shown in a particular order, this is not meant to be limiting. One or more operations may be reordered, omitted or added.

At step 400, the system may identify a photo that is associated with a user and that lacks location data. For example, the system may identify a photo from photo database 150 or client device 106 and the photo may lack location data indicating where the photo was captured. The identified photo may include data that indicates a photo date and/or a photo time when the photo was captured.

At step 405, the system may identify a visit location of the user. For example, the system may identify one or more visit locations of the user from visits location database. In some implementations, the identified visit location may be a visit location determined independent of any location sensor. In some versions of those implementations, the identified visit location may be determined based on one or more non-location sensor based electronic information items of the user.

At step 410, the system may determine a relationship of the photo to the visit location. For example, the system may match the photo date to a location date of the visit location and/or match the photo time to a location time of the visit location. Exact matching and/or soft matching may be utilized. In some implementations, the system may determine a confidence measure for the visit location. For example, the system may determine a confidence measure based on a degree of matching between the data of the photo and the location date and/or location time associated with the visit location. In some implementations, the system may verify a determined relationship of a photo to a visit location based on at least one location indication based on the photo itself.

At step 415, the system may determine a photo location based on the visit location. For example, a photo location that is the same as the visit location may be determined. Also, for example, a photo location that encompasses the visit location and one or more additional areas may be determined. In some implementations, a photo location may include multiple locations. For example, the photo location may include both the visit location and a location that encompasses the visit location and one or more additional areas. In some implementations, the system may determine whether to determine a photo location based on a visit location based on a confidence measure for the visit location. In some implementations, the system may determine a photo location based on the confidence measure for the visit location.

At step 420, the system may associate the photo location with the photo. For example, the system may associate the photo location with the photo locally in memory of the system. In some implementations, the system may provide an indication of the association of the photograph location with the photo to one or more components such as the photo database 150 and/or the client device 106. In some implementations, the photo location engine 144 and/or other component may modify the metadata of the photo to include the photo location determined to be associated with the photo. For example, the photo location engine 144 may modify the metadata of the photo and provide the photo with the modified metadata to the photo database 150 and/or the client device 106.

Figure 6:
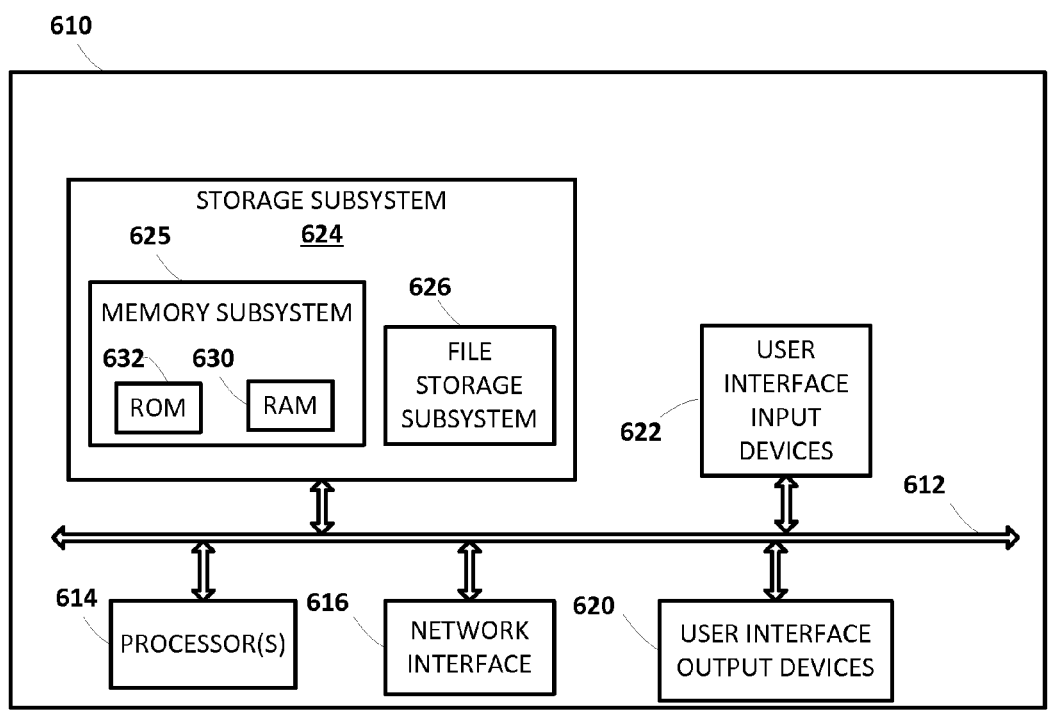
FIG. 6 illustrates an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616.

The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of the method of FIG. 4, as well as one or more of the operations performed by photo location system 140 and/or visit location system 115.

These software modules are generally executed by processor 614 alone or in combination with other processors. Memory 625 used in the storage subsystem can include a number of memories including a main random access memory (RAM) 630 for storage of instructions and data during program execution and a read only memory (ROM) 632 in which fixed instructions are stored. A file storage subsystem 624 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   identifying a digital photo associated with a user, the photo including metadata indicating a photo date and photo time when the photo was captured, the metadata lacking location data indicating where the photo was captured;
   identifying a visit location of the user, the visit location being determined independent of any location sensor and being associated with at least one of: a location date and a location time, wherein the location date and the location time are indicative of when the user potentially interacted with the visit location;
   determining a relationship of the metadata of the photo to at least one of the location date and the location time of the visit location;
   identifying a confidence measure for the visit location;
   determining, responsive to determining the relationship, a photo location based on the visit location, wherein determining the photo location includes determining the photo location based on the confidence measure of the visit location; and
   assigning the photo location to the photo.

2. The method of claim 1, wherein the visit location is determined based on one or more non-location sensor based electronic information items of the user.

3. The method of claim 2, wherein the electronic information items include at least one of: an email, a text message, a calendar entry, a task entry, and a webpage.

4. The method of claim 1, wherein the confidence measure is indicative of likelihood the user was present at the visit location on the location date at the location time.

5. The method of claim 1, further comprising:
determining the confidence measure based on a type of information item from which the visit location of the user was determined.

6. The method of claim 1, further comprising:
determining the confidence measure based on a quantity of the electronic information items that indicate a visit to the visit location.

7. The method of claim 1, further comprising:
determining the confidence measure based on a time difference between the photo time and the location time.

8. The method of claim 1, wherein the visit location indicates a first area and wherein determining the photo location based on the confidence measure of the location includes:
determining the confidence measure fails to satisfy a threshold;
determining, based on the confidence measure failing to satisfy the threshold, a second area for the photo location that encompasses the first area and one or more additional areas.

9. The method of claim 8, wherein the first area indicates a business location and wherein the second area is a geographic region in which the business location is included.

10. The method of claim 1, further comprising:
identifying an additional visit location of the user, the additional visit location being determined independent of any location sensor and being associated with at least one of: an additional location date and an additional location time;
wherein the additional visit location is indicative of a first area that is distinct from a second area indicated by the visit location; and
determining a relationship of the metadata of the photo to at least one of the additional location date and the additional location time of the additional location.

11. The method of claim 10, wherein determining the photo location based on the visit location includes determining the photo location based on both the visit location and the additional visit location.

12. The method of claim 10, further comprising:
determining the first area is indicative of a more granular area than the second area;
wherein determining the photo location based on the visit location includes determining the photo location exclusive of the additional location based on determining the first area is indicative of a more granular area than the second area.

13. The method of claim 1, wherein determining the relationship of the metadata of the photo to at least one of the location date and the location time of the visit location includes:
matching the photo date to the location date and matching the photo time to the location time.

14. The method of claim 13, wherein the location time defines a time range and matching the photo time to the location time includes determining the photo time is within the time range or is within a threshold of the time range.

15. The method of claim 1, further comprising:
identifying at least one location indication based on the photo;
wherein determining the relationship of the metadata of the photo to at least one of the location date and the location time of the visit location further includes verifying the relationship based on the location indication.

16. The method of claim 15, wherein the location indication is based on image processing of the photo.

17. The method of claim 1, further comprising:
identifying location-sensor based location data of the user that indicates a plurality of potential visit locations; and
determining a relationship of the location data to the metadata of the photo;
wherein determining the relationship of the metadata of the photo to at least one of the location date and the location time of the visit location includes determining the relationship based on a relationship between the visit location and the location data.

18. A system comprising:
memory storing instructions; and
one or more processors operable to execute the instructions stored in the memory, comprising instructions to:
identify a digital photo associated with a user, the photo including metadata indicating a photo date and photo time when the photo was captured, the metadata lacking location data indicating where the photo was captured;
identify a visit location of the user, the visit location being determined independent of any location sensor and being associated with at least one of: a location date and a location time, wherein the location date and the location time are indicative of when the user potentially interacted with the visit location;
determine a relationship of the metadata of the photo to at least one of the location date and the location time of the visit location;
identify a confidence measure for the visit location;
determine, responsive to determining the relationship, a photo location based on the visit location, wherein the instructions to determine the photo location include instructions to determine the photo location based on the confidence measure of the visit location; and
assign the photo location to the photo.

19. The system of claim 18, wherein the visit location is determined based on one or more non-location sensor based electronic information items of the user.

20. The system of claim 18, wherein the visit location indicates a first area and wherein the instructions to determine the photo location based on the confidence measure of the location include instructions to:
determine the confidence measure fails to satisfy a threshold;
determine, based on the confidence measure failing to satisfy the threshold, a second area for the photo location that encompasses the first area and one or more additional areas.

21. The system of claim 18, wherein the instructions further include instructions to:
identify an additional visit location of the user, the additional visit location being determined independent of any location sensor and being associated with at least one of: an additional location date and an additional location time;

wherein the additional visit location is indicative of a first area that is distinct from a second area indicated by the visit location; and determine a relationship of the metadata of the photo to at least one of the additional location date and the additional location time of the additional location.

22. A non-transitory computer-readable medium comprising instructions that, in response to execution of the instructions by a computing system, cause the computing system to perform operations comprising:

identifying a photo associated with a user, the photo including metadata indicating a photo date and photo time when the photo was captured, the metadata lacking location data indicating where the photo was captured;

identifying a visit location of the user, the visit location being determined independent of any location sensor and being associated with at least one of: a location date and a location time, wherein the location date and the location time are indicative of when the user potentially interacted with the visit location;

determining a relationship of the metadata of the photo to at least one of the location date and the location time of the visit location;

identifying a confidence measure for the visit location;

determining, responsive to determining the relationship, a photo location based on the visit location, wherein determining the photo location includes determining the photo location based on the confidence measure of the visit location; and associating the photo location with the photo.

* * * * *